(12) United States Patent
Venanzi et al.

(10) Patent No.: US 11,120,373 B2
(45) Date of Patent: Sep. 14, 2021

(54) ADAPTIVE TASK ASSIGNMENT

(71) Applicant: Microsoft Technology Licensing, LLC, Redmond, WA (US)

(72) Inventors: Matteo Venanzi, Southampton (GB); John Philip Guiver, Saffron Walden (GB); Pushmeet Kohli, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1338 days.

(21) Appl. No.: 14/448,628

(22) Filed: Jul. 31, 2014

(65) Prior Publication Data

US 2016/0034840 A1 Feb. 4, 2016

(51) Int. Cl.
*G06Q 10/06* (2012.01)

(52) U.S. Cl.
CPC .......................... *G06Q 10/063112* (2013.01)

(58) Field of Classification Search
None
See application file for complete search history.

(56) References Cited

U.S. PATENT DOCUMENTS

| | | | |
|---|---|---|---|
| 7,809,663 B1 * | 10/2010 | Birch | G06N 99/005 706/14 |
| 8,554,605 B2 | 10/2013 | Oleson et al. | |
| 8,626,545 B2 | 1/2014 | Van Pelt et al. | |
| 8,650,177 B2 | 2/2014 | Skomoroch et al. | |
| 2005/0166179 A1 * | 7/2005 | Vronay | G06Q 10/00 717/105 |

(Continued)

FOREIGN PATENT DOCUMENTS

| | | |
|---|---|---|
| WO | 2013142219 A1 | 9/2013 |
| WO | 2014040179 A1 | 3/2014 |

OTHER PUBLICATIONS

Chien-Ju Ho, et al. "Adaptive Task Assignment for Crowdsourced Classification." Proceedings of the 30th International Conference on Machine Learning, Atlanta, Georgia, USA, 2013, JMLR: W&CP vol. 28. Conference held from Jun. 17-19, 2013.*

(Continued)

*Primary Examiner* — Susanna M. Diaz
(74) *Attorney, Agent, or Firm* — Schwegman Lundberg & Woessner, P.A.

(57) ABSTRACT

Crowdsourcing using active learning is described, for example, to select pairs of tasks and groups of workers so that information gained about answers to the tasks in the pool is optimized. In various examples a machine learning system learns variables describing characteristics of communities of workers, characteristics of workers, task variables and uncertainty of these variables. In various examples, the machine learning system predicts task variables and uncertainty of the predicted task variables for possible combinations of communities of workers and tasks. In examples the predicted variables and uncertainty are used to calculate expected information gain of the possible combinations and to rank the possible combinations. In examples, the crowdsourcing system uses the expected information gain to allocate tasks to worker communities and observe the results; the results may then be used to update the machine learning system.

15 Claims, 7 Drawing Sheets

(56) References Cited

U.S. PATENT DOCUMENTS

| | | | |
|---|---|---|---|
| 2012/0278263 A1* | 11/2012 | Borthwick | G06N 7/005 706/12 |
| 2013/0029769 A1* | 1/2013 | Lee | G06Q 30/02 463/42 |
| 2013/0066961 A1 | 3/2013 | Naik et al. | |
| 2013/0110498 A1 | 5/2013 | Bekkerman | |
| 2014/0156331 A1 | 6/2014 | Cordasco | |
| 2014/0278657 A1* | 9/2014 | Horvitz | G06Q 10/063118 705/7.17 |
| 2014/0289217 A1* | 9/2014 | Werkema | G06F 17/30867 707/710 |
| 2015/0242447 A1* | 8/2015 | Ipeirotis | G06F 16/215 705/14.45 |
| 2016/0379388 A1* | 12/2016 | Rasco | G06Q 10/04 715/753 |

OTHER PUBLICATIONS

Ho, Chien-Ju et al. "Online Task Assignment in Crowdsourcing Markets." Proceedings of the Twenty-Sixth AAAI Conference on Artificial Intelligence. © 2012.*

Venanzi et al. "Community-Based Bayesian Classifier Combination." Proceedings of the 23rd International World Wide Web Conference, ACM, Apr. 2014. Retrieved from [URL: https://dotnet.github.io/infer/userguide/Community-Based%20Bayesian%20Classifier%20Combination.html].*

Venanzi et al. "Community-Based Bayesian Aggregation Models for Crowdsourcing." Proceedings of the 23rd International World Wide Web Conference, ACM, Apr. 7-11, 2014.*

Chen, et al., "Near-optimal Batch Mode Active Learning and Adaptive Submodular Optimization", In Proceedings of the 30th International Conference on Machine Learning, Jun. 16, 2013, 9 pages.

Roy, et al., "Crowds, not Drones: Modeling Human Factors in Interactive Crowdsourcing", In Proceedings of the 39th International Conference on Very Large Data Bases, Aug. 30, 2013, 4 pages.

Ho, et al., "Adaptive Task Assignment for Crowdsourced Classification", In Proceedings of the 30 th International Conference on Machine Learning, Jun. 16, 2013, 19 pages.

Alex, "Glean Valuable User Information via Microsoft's Infer.Net Framework", Published on: Dec. 21, 2011, Available at: http://cyberstride.net/blog/glean-valuable-user-information-via-microsofts-infernet-framework.

Kosinski, et al., "Crowd IQ: Measuring the Intelligence of Crowdsourcing Platforms", In Proceedings of the 4th Annual ACM Web Science Conference, Jun. 22, 2012, 10 pages.

Alonso, et al., "Crowdsourcing for relevance evaluation", In Newsletter ACM SIGIR Forum, vol. 42 Issue 2, Dec. 2008, 7 pages.

Bachrach, et al., "How to grade a test without knowing the answers—a bayesian graphical model for adaptive crowdsourcing and aptitude testing", In Proceedings of the 29 th International Conference on Machine Learning, Jun. 26, 2012, 8 pages.

Bernstein, et al., "Soylent: a word processor with a crowd inside", In Proceedings of the 23nd annual ACM symposium on User interface software and technology, Oct. 3, 2010, 10 pages.

Blanco, et al., "Repeatable and reliable search system evaluation using crowdsourcing", In Proceedings of the 34th international ACM SIGIR conference on Research and development in Information Retrieval, Jul. 24, 2011, pp. 923-932.

Blei, et al., "Correlated topic models", In Proceedings of Advances in neural information processing systems, vol. 18, Dec. 4, 2006, 8 pages.

Bragg, et al., "Crowdsourcing multi-label classification for taxonomy creation", In Proceedings of the First Conference on Human Computation and Crowdsourcing, Nov. 7, 2013, 2 pages.

Brew, et al., "Using crowdsourcing and active learning to track sentiment in online media", In Proceedings of 19th European Conference on Artificial Intelligence : vol. 215, Aug. 16, 2010, 6 pages.

Costa, et al., "On using crowdsourcing and active learning to improve classification performance", In 11th International Conference on Intelligent Systems Design and Applications, Nov. 22, 2011, 6 pages.

Deng, et al., "Imagenet: A large-scale hierarchical image database", In IEEE Conference on Computer Vision and Pattern Recognition, Jun. 20, 2009, 8 pages.

Kamar, et al., "Combining human and machine intelligence in large-scale crowdsourcing", In Proceedings of the 11th International Conference on Autonomous Agents and Multiagent Systems, vol. 1, Jun. 4, 2012, 8 pages.

Kamar, et al., "Light at the end of the tunnel: a monte carlo approach to computing value of information", In Proceedings of the 12th International Conference on Autonomous Agents and Multiagent Systems, May 6, 2013, pp. 571-578.

Kim, et al., "Bayesian classifier combination", In Proceedings of the 15th International Conference on Artificial Intelligence and Statistics, Apr. 21, 2012, 9 pages.

Krizhevsky, et al., "Imagenet classification with deep convolutional neural networks", In Proceedings of Advances in Neural Information Processing Systems 25, Dec. 3, 2012, 9 pages.

Raykar, et al., "Sequential crowdsourced labeling as an epsilon-greedy exploration in a markov decision process", In Proceedings of the 17th International Conference on Artificial Intelligence and Statistics, Apr. 22, 2014, 9 pages.

Simpson, et al., "Dynamic bayesian combination of multiple imperfect classifiers", In Proceedings of Decision Making and Imperfection, vol. 474, Retrieved on: Jul. 18, 2014, 36 pages.

Venanzi, et al., "Community-based bayesian aggregation models for crowdsourcing", In Proceedings of the 23rd international conference on World wide web, Apr. 7, 2014, 10 pages.

Ahn, et al., "Labeling images with a computer game", In Proceedings of the SIGCHI Conference on Human Factors in Computing Systems, Apr. 24, 2004, 8 pages.

Welinder, et al., "Online crowdsourcing: rating annotators and obtaining cost effective labels", In IEEE Computer Society Conference on Computer Vision and Pattern Recognition Workshops, Jun. 13, 2010, 8 pages.

Winn, et al., "Variational message passing", In Journal of Machine Learning Research, vol. 6, Apr. 2005, pp. 661-694.

Zhao, et al., "Incremental relabeling for active learning with noisy crowdsourced annotations", In IEEE International Conference on Privacy, Security, Risk, and Trust, Oct. 9, 2011, 6 pages.

Hosseini, et al., "On Aggregating Labels from Multiple Crowd Workers to Infer Relevance of Documents", In Proceeding of the Advances in Information Retrieval—34th European Conference on IR Research, Apr. 1, 2012, vol. 7724, 13 pages.

Sheng, et al., "Get Another Label? Improving Data Quality and Data Mining Using Multiple, Noisy Labelers", In Proceedings of the Fourteenth ACM SIGKDD International Conference on Knowledge Discovery and Data Mining, Aug. 24, 2008, 9 pages.

Raykar, et al., "Eliminating Spammers and Ranking Annotators for Crowdsourced Labeling Tasks", In Journal of Machine Learning Research, vol. 13, Feb. 2012, 28 pages.

Ruvolo, et al., "Exploiting Commonality and Interaction Effects in Crowdsourcing Tasks Using Latent Factor Models", Oct. 30, 2013, Available at: http://www.ics.uci.edu/~qliu1/nips13_workshop/Papers/ActivePaper5.pdf.

Ertekin, et al., "Approximating the Wisdom of the Crowd", Published on: Mar. 17, 2013, Available at: http://web.mit.edu/seyda/www/Papers/NIPS11Workshop_ApproximatingWC.pdf.

Dekel, et al., "Vox Populi: Collecting High-Quality Labels from a Crowd", In Proceedings of the 22nd Annual Conference on Learning Theory, Jun. 2009, 10 pages.

Liu, et al., "TrueLabel + Confusions: A Spectrum of Probabilistic Models in Analyzing Multiple Ratings", In Proceedings of the 29th International Workshop on Conference Machine Learning, Jun. 26, 2012, 8 pages.

Loni, et al., "Crowdsourcing for Social Multimedia at MediaEval 2013: Challenges, Data set, and Evaluation", In Proceedings of the MediaEval Workshop, Oct. 18, 2013, 2 pages.

(56) References Cited

OTHER PUBLICATIONS

Lease, Matthew, "On Quality Control and Machine Learning in Crowdsourcing", In Proceedings of the Human Computation: Papers from the AAAI Workshop, Aug. 2011, 6 pages.
Chen, et al., "Pairwise Ranking Aggregation in a Crowdsourced Setting", In Proceedings of the Conference Series Web Search and Data Mining, Feb. 4, 2013, 10 pages.
Ghahramani, et al., "Bayesian Classifier Combination", In Fifteenth International Conference on Artificial Intelligence and Statistics, Apr. 21, 2012, 9 pages.
Psorakis, et al., "Overlapping Community Detection using Bayesian Nonnegative Matrix Factorization", In Journals of Physical Review E, vol. 83, Issue 6, Jun. 22, 2011, 9 pages.
Simpson, et al., "Dynamic Bayesian Combination of Multiple Imperfect Classifiers", In Workshop on Human Computation for Science and Sustainability, Jan. 14, 2013, 36 pages.
Minka and Winn "Gates" in Advances in Neural Information Processing Systems, pp. 1073-1080, 2008 available at http://papers.nips.cc/book/advances-in-neural-information-processing-systems-21-2008.
T. Minka, J. Winn, J. Guiver, and D. Knowles Infer.NET 2.5 software, Microsoft Research Cambridge, 2012. Available at http://research.microsoft.com/infernet.
Minka et al. 2012 Infer.NET introduction available at http://research.microsoft.com/infernet/docs/InferNet_Intro.pdf.
Minke et al. 2012 Infer.NET 101 file available at http://research.microsoft.com/infernet/docs/InferNet101.pdf.

\* cited by examiner

ADAPTIVE TASK ASSIGNMENT

Crowdsourcing systems (also referred to as crowdsourcing platforms) are increasingly available and are used to offer tasks to individuals or teams over the internet or using other communications methods. The tasks being offered may be labeling or ranking tasks whereby individuals classify items into classes or ranges. For example, to classify an email as being spam or not, to rate a movie, to classify a document as belonging to one of a several possible categories, to rate the relevance of a search result, and others.

A crowdsourcing platform typically has access to a pool of tasks and a crowd of potential participants, who are individuals referred to herein as workers. For a given pool of tasks, a crowdsourcing platform is faced with the problem of how to select combinations of tasks and workers, so that it can issue the selected tasks to the selected workers. Previously this has been achieved by randomly selecting combinations of tasks and workers. Other approaches have attempted to assess all possible combinations of tasks and workers before making a selection which is very slow and/or not practical. Where the number of combinations is huge it is typically computationally unfeasible to assess all the possible combinations.

The embodiments described below are not limited to implementations which solve any or all of the disadvantages of known crowdsourcing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Crowdsourcing using active learning is described, for example, to select pairs of tasks and groups of workers so that information gained about answers to the tasks in the pool is optimized. In various examples a machine learning system learns variables describing characteristics of communities of workers, characteristics of workers, task variables and uncertainty of these variables. In various examples, the machine learning system predicts task variables and uncertainty of the predicted task variables for possible combinations of communities of workers and tasks. In examples the predicted variables and uncertainty are used to calculate expected information gain of the possible combinations and to rank the possible combinations. In examples, the crowdsourcing system uses the expected information gain to allocate tasks to worker communities and observe the results; the results may then be used to update the machine learning system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The same reference numerals are used to designate similar parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a crowdsourcing system for rating search results from different information retrieval systems, the system described is provided as an example and not a limitation. As those skilled in the art will appreciate, the present examples are suitable for application in a variety of different types of crowdsourcing system where other tasks are crowdsourced, including but not limited to: classification tasks such as image classification, ranking tasks such as search result relevance ranking, movie rating, product rating; or other tasks involving human intelligence and typically where no ground truth answers are readily available for the tasks. Inferred data from the crowdsourcing system may, in some examples, be used to train a downstream system such as an information retrieval system, spam email filter, medical image analysis system, document storage system or other equipment which is then itself used for ongoing operation.

Note that selecting combinations of tasks and workers is a different problem from selecting which task, from a pool of tasks, is to be allocated next. So called active learning systems reason about the next task to be labelled. In contrast, the examples described herein are concerned with adaptive reasoning about which task should be labeled by which community of workers.

Figure 1:
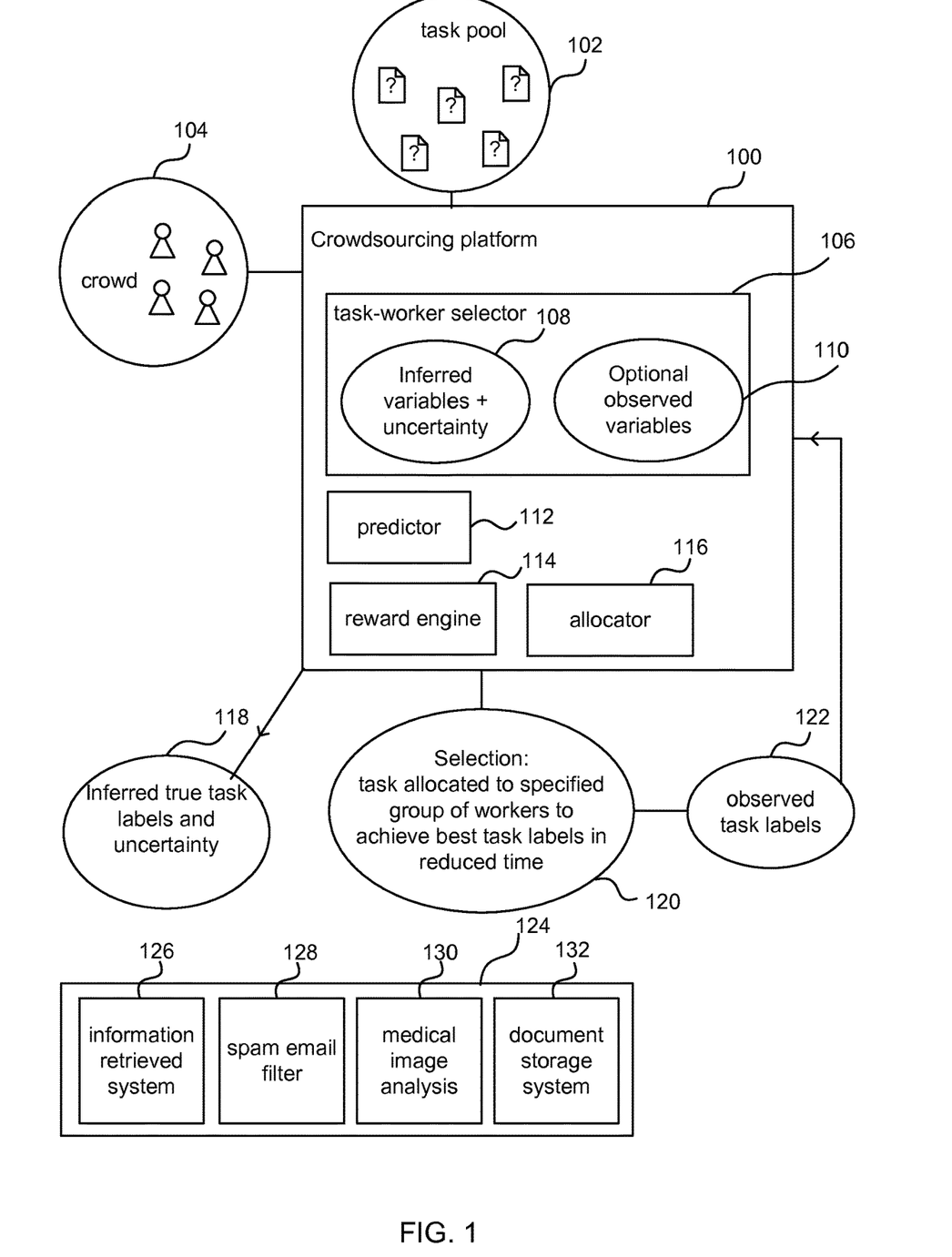
FIG. 1 is a schematic diagram of a crowdsourcing platform.

FIG. 1 is a schematic diagram of a crowdsourcing platform 100 comprising a task-worker selector 106, a predictor 112, a reward engine 114 and an allocator 116. These components are each computer implemented using software and/or hardware and are either integral in a crowdsourcing platform apparatus 100 or are located at different computing entities which are in communication with one another. The task-worker selector 106 and the predictor 112 comprise machine learning inference algorithms which form a machine learning system. For example, the inference algorithms may be compiled from probabilistic graphical models, or may be hand-coded and stored at the task-worker selector 106 and predictor 112. The inference algorithms may use any suitable inference techniques including but not limited to MCMC and variational methods. The inference algorithms at the task-worker selector 106 are arranged to infer latent (unobserved) variables 108 and uncertainty of those variables. For example, the latent variables include: worker characteristics, characteristics of communities of workers, and true task labels. A community of workers is a group of two or more individual workers which is inferred by the task-worker selector 106. Knowledge about the communities of workers may change and/or become more defined and certain as the inference at the task-worker selector progresses. A community of workers may be considered virtual rather than a physical community. In an example, a community may comprise crowd members observed to have similar biases when completing a particular type of crowdsourced task. The task-worker selector 106 optionally also uses observed variables 110 such as observed task features or observed worker features but this is not essential. Examples of observed worker features include but are not limited to: educational qualifications, experience, age, spoken languages. Examples of observed task features include but are not limited to, number of possible labels, type of task e.g. reading, visual, audio.

The latent variables at the inference algorithms may be initialized with default values and are incrementally updated as observed task labels 122 are input to the crowdsourcing platform 100. Example inference algorithms which may be used at the task-worker selector 106 are described in detail in U.S. patent application Ser. No. 14/162,962 filed on 24 Jan. 2014 and they are also described below with reference to FIGS. 4 and 5. Example, inference algorithms for use at the predictor 112 are described below with reference to FIG. 6.

An adaptive crowdsourcing platform is faced with a problem of how to select task-worker combinations so that the incremental process of learning the latent true task labels is fast and gives accurate true task labels 118. In the examples described herein the task-worker selector 106 and predictor 112 use active learning by intelligently making good selections 120 of tasks and groups of workers. The resulting observed task labels 122 are used for inference at the crowdsourcing platform and the inference results further refine knowledge of the inferred variables. The knowledge of the inferred variables is then used to intelligently make another good selection 120 and so on.

By assessing combinations of tasks and groups of workers, rather than combinations of tasks and individual workers, the number of combinations to be assessed is reduced. This is achieved without the expense of loss of accuracy by using the inferred variables. In this way accuracy can be achieved in realistic, practical computation times. Also, by issuing a task to a group of workers, rather than to an individual worker, the risk that the individual worker does not respond is mitigated.

The predictor 112 intelligently makes good selections, by using the inferred variables and uncertainty from the task-worker selector to predict updates to the inferred true task label variables. These predictions are used to calculate expected information gain of different combinations of tasks and communities of workers. The expected information gain is how much uncertainty in the inferred true tasks label variables of the task pool is expected to be removed if the task is issued to the proposed group of workers. In this way the different combinations of tasks and communities of workers may be ranked by expected information gain and the ranking used to make the selection 120.

The crowdsourcing platform is arranged to publish tasks to a crowd 104 of potential participants in the tasks. The potential participants may be individual people, referred to as workers, who are able to view tasks published by the crowdsourcing platform 100 and to submit answers to the published tasks. The submitted answers are referred to as observed task labels 122 and are input to the crowdsourcing platform 100. For example, the crowdsourcing platform 100 may serve web pages publishing the tasks and the individuals in the crowd 104 may have end user computing equipment enabling them to submit answers to the published tasks. However, it is not essential to use web-based communications. The crowdsourcing platform 100 may publish the tasks in other ways, for example, by sending email messages, and may receive answers in any suitable automated manner over a communications network. In the example of FIG. 1 only four individuals are shown in the crowd 104 for clarity; in practice hundreds of thousands or millions of individuals may be in the crowd 104.

The crowdsourcing platform 100 observes task labels 122. The observed data comprises at least the answers to the tasks (the observed workers' labels), data about the tasks (such as a task identifier), and crowd member references. In some examples additional features of the tasks and/or crowd members may be used where appropriate consent of crowd members is given. The observed data is used to carry out inference at the task-worker selector 106 and predictor 112 to infer task labels, community characteristics, worker characteristics and uncertainty about these variables. The crowdsourcing platform 100 optionally comprises a reward engine 114 and an allocator 116. The reward engine is able to calculate and issue rewards using at least learnt data output from the task-worker selector 106 and predictor 112. For example, communities of workers found to be motivated and unbiased may receive more rewards. The allocator is able to issue tasks to individual workers and/or communities of workers on the basis of output from the predictor 112 and task-worker selector 106. For example, the allocator may send email messages, update web pages, or send messages of other types in order to allocate the tasks.

As mentioned above, the inferred variables and uncertainty from the crowdsourcing system, such as the inferred true task labels 118 may, in some examples, be used to train a downstream system 124 such as an information retrieval system 126, spam email filter 128, medical image analysis system 130, document storage system 132, or other equipment which is then itself used for ongoing operation. For example, label data about relevance of search results may be used to update an index of an information retrieval system which is then used to retrieve more relevant results in response to future queries. For example, email spam/not spam labels may be used to train a spam email filter 128 which is then better able to identify incoming email it receives as spam or not and block the email accordingly. For example, document category labels may be used to train a document storage system 132 to store documents in appropriate categories and enable those to be retrieved more easily using category searches. For example, labels of medical images may be used to train a medical image analysis system 130 to automatically classify future images and trigger alerts on the basis of the classifications. These examples of downstream systems 124 are only some of a wide range of other possible downstream systems which may be trained using aggregated labels of human intelligence tasks.

Figure 2:
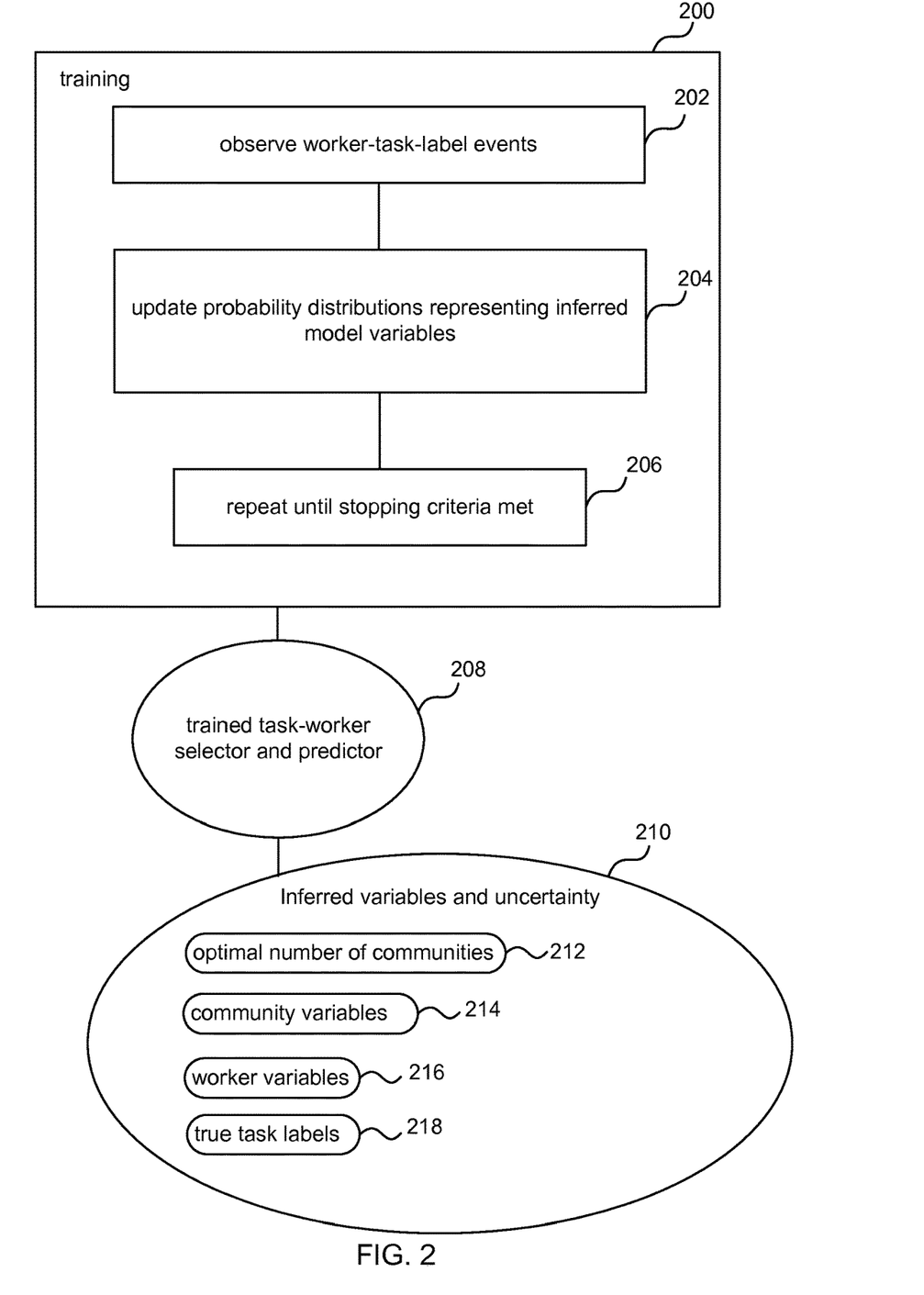
FIG. 2 is a flow diagram of a method of training machine learning components of the crowdsourcing platform of FIG. 1.

FIG. 2 is a flow diagram of a method at the crowdsourcing system of FIG. 1 for training (also referred to as inference) the task-worker selector 106 and/or predictor 112. For example, a search query is submitted to each of two different information retrieval systems and the results from the first information retrieval system are displayed on a left hand side of a display and the results from the second information retrieval system are displayed on a right hand side of the display. One or more crowd workers are asked to label the results on the left hand side as being better, the same or worse than the results on the right hand side. The particular task and the crowd workers have been selected by the task-worker selector and predictor as described in more detail below. The allocator 116 publishes the task to the selected workers, taking into account any criteria and/or budgets to be applied. For example, the criteria may specify a degree of diversity required in the crowd members to be issued the task and/or may specify a quota of crowd members to be issued the task. The crowdsourcing platform receives labels 122 from a plurality of the crowd members in response to the published task.

The crowdsourcing system observes 202 task events. The crowdsourcing platform sends 206 observed data about the task event (in batches, where offline batch mode is used) to the inference algorithms. The inference algorithms may be at the crowdsourcing platform or may be at a remote computing entity. The observed data about the task event(s) comprises at least an identifier of the task(s), references of the crowd members that generated labels, and the labels. The inference algorithms use the observed data to update belief about the inferred variables. This comprises updating 204 probability distributions representing inferred model variables. The inference process repeats 206 until stopping criteria are met. For example, when the batch of data is processed in the case of batch training.

The resulting trained task-worker selector and predictor 208 are stored. In this way inferred variables 210 and uncertainty about those variables is available. For example, the inferred variables comprise, community variables 214 (which include an optimal number of communities 212), worker variables 216 and true task labels 218.

The method of FIG. 2 may also be adapted for incremental learning by sending the observed labels as a stream to the inference components for online inference rather than sending those in batches.

Figure 3:
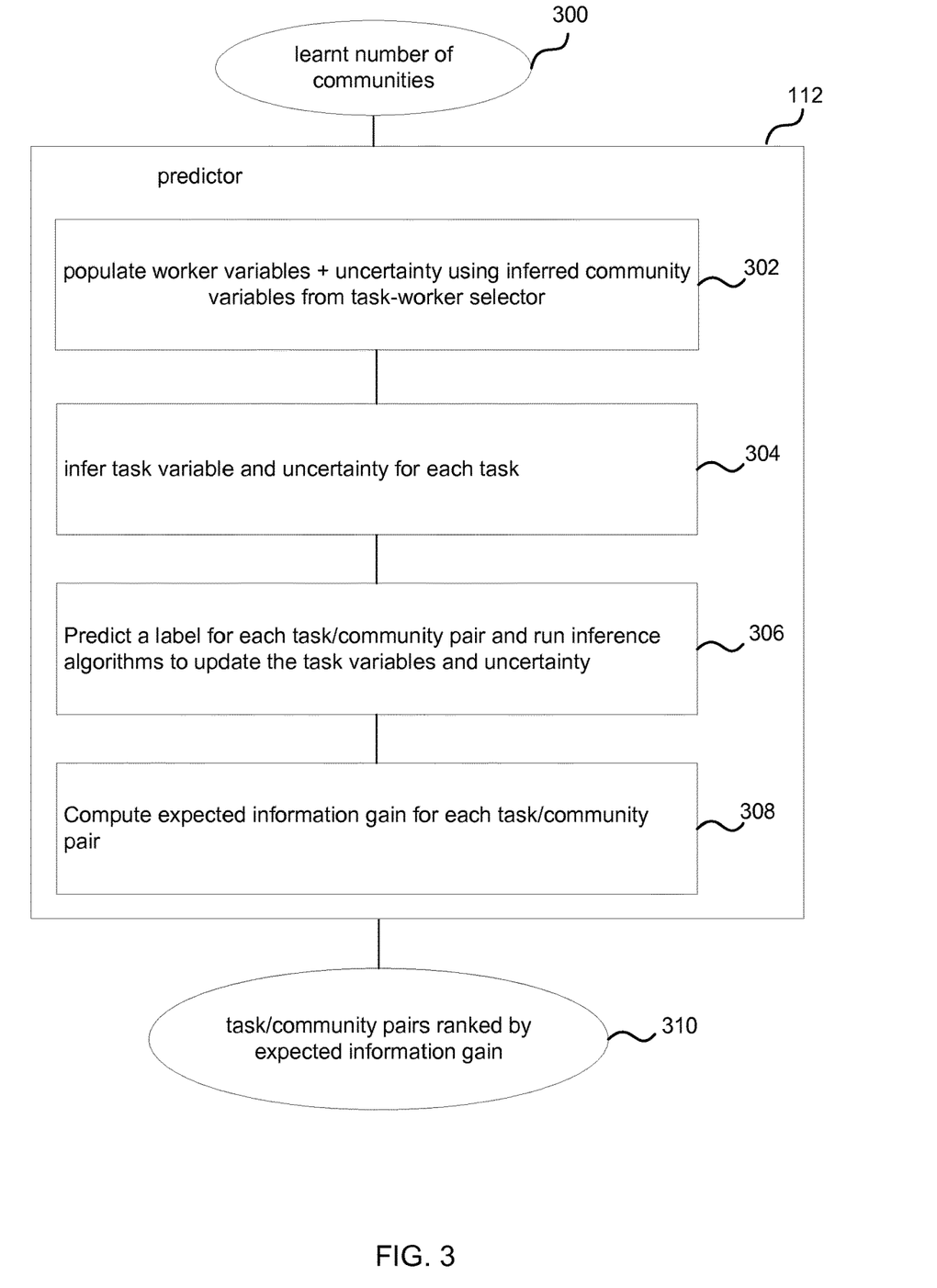
FIG. 3 is a flow diagram of a method at a predictor of the crowdsourcing platform of FIG. 1.

FIG. 3 is a flow diagram of a method at the predictor 112 of FIG. 1. The predictor has access to the inferred variables and uncertainty 108 of the task-worker selector.

As mentioned above the predictor comprises inference algorithms which may be hand-coded or may be compiled from a probabilistic graphical model. The inference algorithms of the predictor are not configured to take into account communities of workers.

For example, it receives a learnt number of communities 300 existing in the crowd 104. It treats each community as if it were a single individual worker and adapts its inference algorithms for this number of individual workers. It populates inferred variables of its inference algorithms with data from the inferred variables of the task-worker selector. For example, a community variable and its associated uncertainty from the task-worker selector are populated 302 to a worker variable and its associated uncertainty of the predictor. Task variables and their associated uncertainty are then inferred 304 using the inference algorithms of the predictor.

The predictor 112 predicts a label for each task/community pair using the inferred variables and uncertainty; then it treats the prediction as an observation and operates its inference algorithms. This computes, updated inferred task variables and uncertainty.

Using the inferred task variables from before and after the update using the predictions, the predictor calculates an expected information gain for each task and community pair. The predictor is then able to output task and community pairs 310 ranked by expected information gain.

A detailed example of calculating the expected information gain is now given using mathematical notation.

The information gain may be calculated as a utility U using the following equation:

$$U(m,i)=\Sum_{j=1}^{c} p(c_i^{(m)}=j) \Sum_{i=1}^{N} I(t_i | c_i^{(m)}=j)$$

Which may be expressed in words as the utility of receiving label c for task i from the community m is equal to the sum over all possible label values j (from the set of possible label values C) of the probability of the label value times the sum over tasks (N is the total number of tasks, and i is a task) of entropy reduction of the inferred task variable $t_i$, upon receiving the label. The term $I(t_i | c_i^{(m)})$ is the entropy reduction of the inferred task variable $t_i$, upon receiving the label $c_i^{(m)}$.

Figure 6:
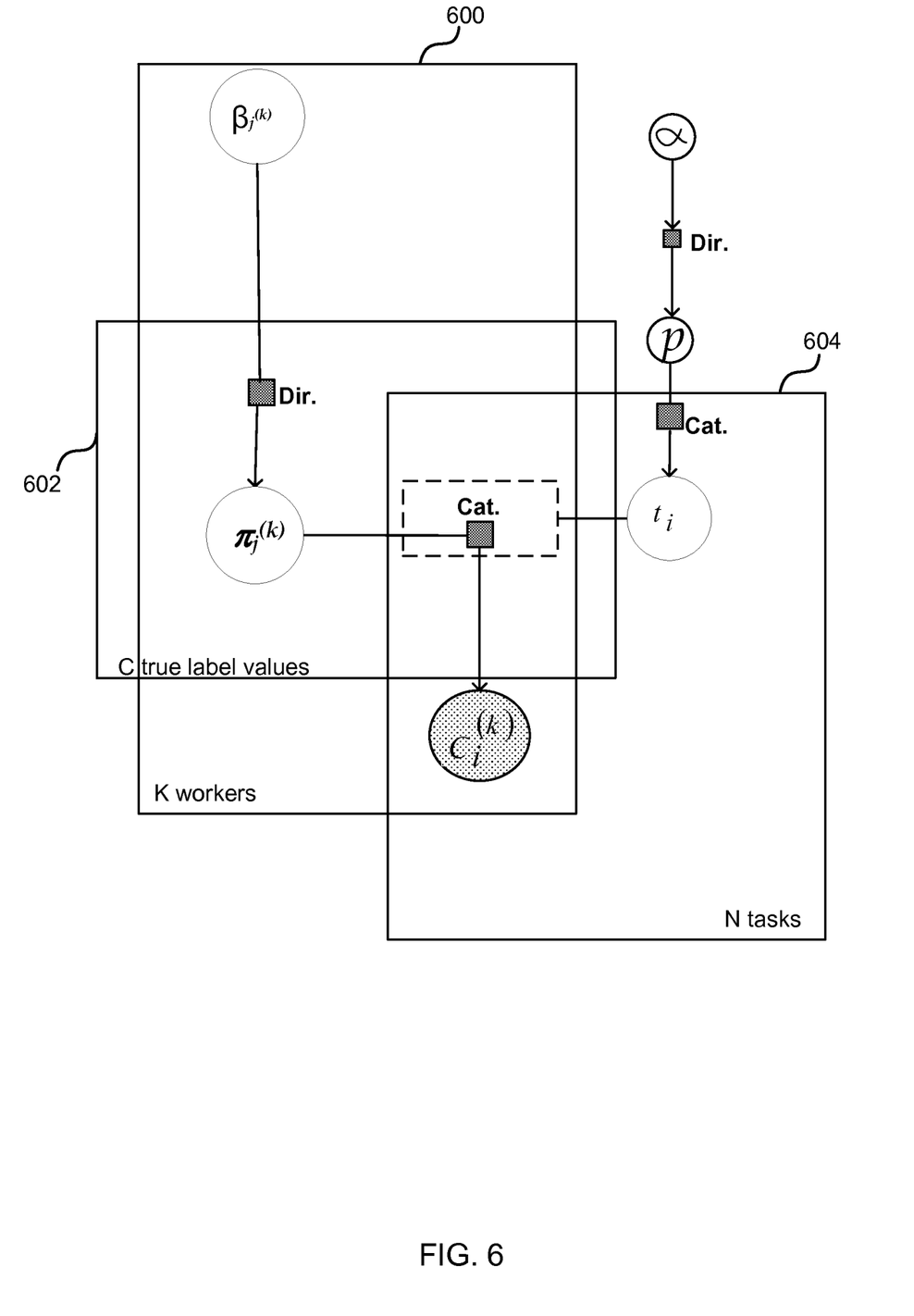
FIG. 6 is a schematic diagram of a probabilistic graphical model for use in the predictor of the crowdsourcing platform of FIG. 1.

To compute the above utility, the community's predictive labeling distribution $p(c_i^{(m)})$ is to be computed. This may be achieved using the predictor, for example, with inference algorithms corresponding to the graphical model of FIG. 6 and where the number of workers is reduced to the number of communities M inferred by the task-worker selector. The confusion matrix of each worker may be set to the prior of a corresponding community's confusion matrix from the task-worker selector. That is, the community's accuracy profile is used as the representative worker's profile. In this way, the inference algorithms corresponding to the graphical model of FIG. 6 are simplified to reason about a small number of workers and it is possible to obtain the community's predictive labeling distributions using inference in the model of FIG. 6. Then, the information gain of the true label is computed by predicting a possible label (from the inferred true label variables) and retraining the model online to compute the updated probabilities of the true task labels. This operation uses few message passing iterations since a single label is observed and in this way the process can be scaled up to web-scale operation in a practical manner.

An optimal task-community pair may be selected as the one which maximizes the utility using the posterior distributions computed from the inference algorithms of the task-worker selector. This may be expressed as: the optimal task-community pair at round r of the process at the crowdsourcing platform is equal to:

$$\underset{m,i}{\mathrm{argmax}} U_{r-1}(m, i).$$

Detail about probabilistic graphical models, together with examples of probabilistic graphical models which may be used is now given.

Figure 4:
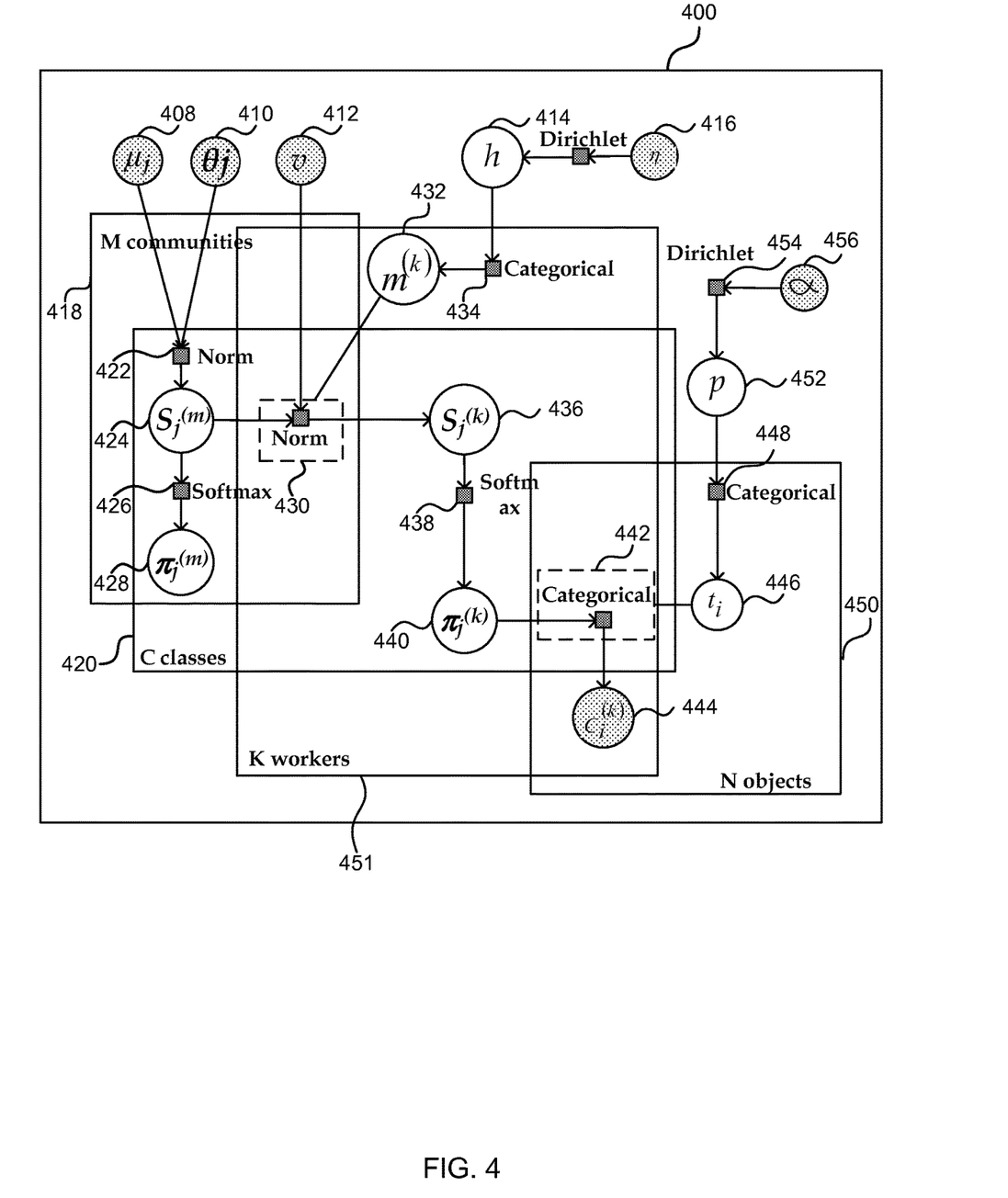
FIG. 4 is an example probabilistic graphical model for use with the crowdsourcing platform of FIG. 1.

A probabilistic graphical model is a collection of nodes connected by edges (also referred to as links). The example described with reference to FIG. 4 is a probabilistic graphical model referred to as a factor graph where the square nodes ("factor nodes") comprise factors, which represent deterministic or stochastic computations, and the round nodes ("variable nodes") represent variables in the model. Each factor node encodes dependencies between the variables that are attached to it. The product of all the factors represents the full relationship between all variables in the model. The structure of the probabilistic graphical model (that is the way the nodes are interconnected) is arranged in the examples described herein so that latent (unobserved) variable nodes describing individual worker characteristics are related to at least one latent variable node describing community characteristics of a community the individual worker is believed to be a member of. The probabilistic graphical model may comprise plates which are replicated parts of the model. The probabilistic model may comprise gates as described in more detail below.

FIG. 4 is an example of a probabilistic graphical model which may be used by the task-worker selector. This is an example only and many other forms of probabilistic graphical model may be used where worker variables are related to community variables. In FIG. 4 the unshaded circular nodes 414, 424, 428, 432, 436, 440, 446, 452, represent latent (unobserved) variables which are to be learnt. The square nodes represent factors or computational units. In FIG. 4 the types of computation applied by the various factors are written next to the factor nodes 422, 426, 430, 434, 438, 448, 454. The shaded circular nodes represent either observed variables or prior knowledge such as knowledge about a range of values a variable may take, or knowledge that a variable must meet specified constraints. For example, prior knowledge may be used to inform inference about the number of communities and/or the composition of the communities.

The example of FIG. 4 may be modified by introducing a factor to ensure that the inferred communities under the model do not deviate too much in terms of their composition from prior knowledge about clusters of the workers obtained from a separate clustering process.

The probabilistic graphical model of FIG. 4 comprises plate 450 which contains nodes representing random variables representing the characteristics of a task (also referred to as an object). In plate 450, node 444 represents observed variable C representing the class (or label) assigned to the object i (task) by a worker k. Node 446 represents random variable t which represents the true class of the object i (which is the aggregated label). Plate 450 is replicated for each task.

The probabilistic graphical model of FIG. 4 also comprises plate 451 which contains nodes representing random variables describing belief about characteristics of a worker k. Plate 451 comprises latent random variable node 432 representing which community m the worker k is a member of Plate 451 is replicated for each worker.

The probabilistic graphical model of FIG. 4 also comprises plate 418 which contains random variable nodes representing characteristics of a community. Plate 418 comprises latent random variable nodes 424 and 428. Random variable node 428 represents the row of confusion matrix for true label j and community m, and random variable node 424 represents the log of node 428. Plate 418 is replicated for each community. A confusion matrix may be a 2D array representing the biases of a worker, or a community of workers. For example, the rows and columns are indexed by the possible label values, with an entry representing the probability that the worker or community will pick that column's label given the true label as represented by the row. A confusion matrix is an example of a variable describing a worker or a community characteristic. It is not essential to use confusion matrices as other types of variables describing worker or community characteristics may be used, for example variables representing various qualities of the worker or community such as decisiveness or accuracy. For a given class, the community score variable relates to a row of the community confusion matrix. For a given class the worker score variable relates to a row of the worker confusion matrix.

The probabilistic graphical model of FIG. 4 also comprises plate 420 which contains nodes representing variables describing a class (a label category that may be assigned to a task). For example, in the side-by-side search results example of FIG. 2 there are three possible classes. Plate 420 is replicated for each possible class.

The community score variable 424 receives input from variable nodes 408, 410 via factor node 422. Variable nodes 408 and 410 represent knowledge about the community score variable which is assumed to apply. An example of such knowledge is that values in each row sum to 1. Variable nodes 412, 416 and 456 also represent knowledge or constraints that are assumed to apply.

The dashed rectangles 430, 442 represent gates which are switched on or off depending on the value of the random gating variable (the variable that is attached to the edge of the gate). The community that a given worker is a member of is represented by variable 432 and this gates which community plate the worker plate is derived from for each class. The community score variable 424 for the worker is used by the factor node within gate 430 to generate the worker score 436, in this example by adding Gaussian noise. The worker score variable 436 is used by factor node 438 to produce worker confusion matrix 440. The true label gates which row of the worker confusion matrix is used to generate the observed label 444.

The model of FIG. 4 is now described more formally using mathematical notation. Bold symbols are used to denote sets, vectors and matrices in the following text.

Consider that there are K workers classifying N objects into C possible classes. Let $t_i$ be the latent true class (the aggregated label) of object i. Let $\pi_{c,j}^{(k)}$, with c; j∈C, be the probability that worker k will classify an object of class c as j. Finally, $c_i^{(k)}$ is the label submitted by worker k for the object i and C is the set of all the observed labels. For simplicity of notation, in what follows assume a dense set of labels in which all the workers label all the objects. However, the model implementations described herein also support sparsity in the label set.

The true class, $t_i$, of an object i is generated from a categorical distribution with parameters p:

$$t_i|p \sim \text{Cat}(t_i|p)$$

where p denotes the class proportions across all the objects.

The label, $c_i^{(k)}$, submitted by worker k for object i is then generated from a categorical distribution with parameters $\pi_c^{(k)}$ conditional on the latent true class:

$$c_i^{(k)}|\pi^k, t_i \sim \text{Cat}(c_i^{(k)}|\pi_{t_i}^{(k)})$$

where $\pi^{(k)} = \{\pi_1^{(k)}, \ldots, \pi_c^{(k)}\}$ is the set of row probability vectors representing the confusion matrix of worker k.

The model of FIG. 4 assumes that there are M communities of workers within the crowd. Each community m is associated with a confusion matrix $\pi^{(m)}$. Let $m^{(k)}$ be the community membership of worker k. Then, assume that $m^{(k)}$ is generated from a categorical distribution with parameters h:

$$m^{(k)}|h \sim \text{Cat}(m^{(k)}|h)$$

where h represents the proportions of community memberships across the workers. Further, each community has a probability score $s_j^m$ representing the log probability vector of the $c^{th}$ row of the confusion matrix $\pi^{(m)}$ of community m. Apply a softmax operator to the community score for all the classes c to derive a normalised exponentiated version of $s_j^m$, which is referred to herein as a row of the community confusion matrix $\pi_j^{(m)}$:

$$p(\pi_j^{(m)}|s_j^m) = \delta(\pi_j^{(m)} - \text{softmax}(s_j^m))$$

Here S is the Dirac delta function imposing the equality constraint between $\pi_j^{(m)}$ and the deterministic softmax function of $s_j^m$.

In the example of FIG. 4 the model encodes the relationship between the confusion matrix of the community and the workers that belong to it. That is, each worker k has an individual score vector $S_j^{(k)}$, one for each label j, generated from the score vector $(s_j^{(m^{(k)})})$ of the community $m^{(k)}$ (i.e. the worker k's community score), through a multivariate Gaussian draw:

$$s_j^{(k)}|s_j^{(m^{(k)})} \sim \mathcal{N}_{(s_j^{(k)}|s_j^{(m^{(k)})}, v^{-1}I)}$$

where v is a hyperparameter representing the isotropic precision of the worker confusion matrix rows within a community. From this, $\pi_j^{(k)}$ is derived as the normalised exponentiated version of $s_j^{(k)}$, i.e. the softmax of $s_j^{(k)}$. Formally:

$$p(\pi_j^{(k)}|s_j^k) = \delta(\pi_j^{(k)} - \text{softmax}(s_j^k))$$

$c_i^k$ is generated by a categorical distribution conditioned on $\pi_{t_i}^{(k)}$ i.e. the row of the confusion matrix $\pi^{(k)}$ is conditioned on the true latent label $t_i$.

To train the model of FIG. 4 observed data from the crowdsourcing platform is used to populate observed class variable 444 and updates are made to probability distributions representing the beliefs of the latent variables. This is achieved using message passing algorithms. The message passing algorithms may be stored at the inference components.

The updated probability distributions representing beliefs of the latent variables may be accessed at any stage and provide the learnt data described above. For example, probability distributions describing belief about the true aggregated labels t, belief about worker and community scores and belief about community membership of workers.

A detailed example of how inference is performed in the model of FIG. 4 is now given.

Assume that the class assignments of objects from workers (denoted by C) are observed. Given C, the inference components infer the posterior distributions of the set of the parameters: $\Theta = \{s^m, \pi^{(m)}, s^{(k)}, \pi^{(k)}, t, p\}$ This is achieved by applying Bayes' theorem to compute the joint posterior distribution of $\Theta$ conditioned on C:

$$p(\Theta|C) \propto p(C|\pi_{t_i}^{(k)}, t) p(t|p) p(p) p(\pi^{(k)}|s^{(k)}) p(s^{(k)}|s^{m^{(k)}}) p(m^{(k)}|h) p(s^{(m^{(k)})})$$

The priors for the parameters h and $s_m$ may be specified by the following conjugate distributions:

$$h|\alpha \sim \text{Dir}(h|\alpha)$$

$$s_j^{(k)}|\theta \sim \mathcal{N}_{(s_j^{(k)}|\mu, \theta^{-1}I)}$$

That is, the prior for h is a Dirichlet distribution with parameters a while the prior for $s_j^{(k)}$ is a multivariate Gaussian distribution with mean μ and isotropic precision θ. Assuming that labels are generated independently, and incorporating the expressions of the model distributions described above, the following expression for the joint posterior distribution is obtained:

$$p(\Theta|C) \propto \text{Dir}(p|\alpha) \Pi_{i=1}^{N} \{\text{Cat}(t_i|p)\} \Pi_{k=1}^{K} \{\text{Cat}(c_i^{(k)}|\pi_{t_i}^{(k)})$$

$$\delta(\pi_{t_i}^{(m^{(k)})} - \text{softmax}(s_{t_i}^{(m^{(k)})})) \text{Dir}(h|\alpha)$$

$$\mathcal{N}_{(s_{t_i}^{(k)}|s_{t_i}^{(k)}, v^{-1}I)} \mathcal{N}_{(s_{t_i}^{(m^{(k)})}|\mu, \theta^{-1}I(\text{Cat}(m^{(k)}|h)\}}$$

To compute the approximate marginal distribution of each parameter, variational message passing algorithms may be used. Finally, to find the optimal number of communities M*, the maximum marginal likelihood model selection criterion may be used. This may be computed through marginalizing out the parameters in $\Theta$. Formally:

$$M^* = \arg\max_M \int_\Theta p(C|\Theta, M) p(\Theta) d\Theta.$$

Figure 5:
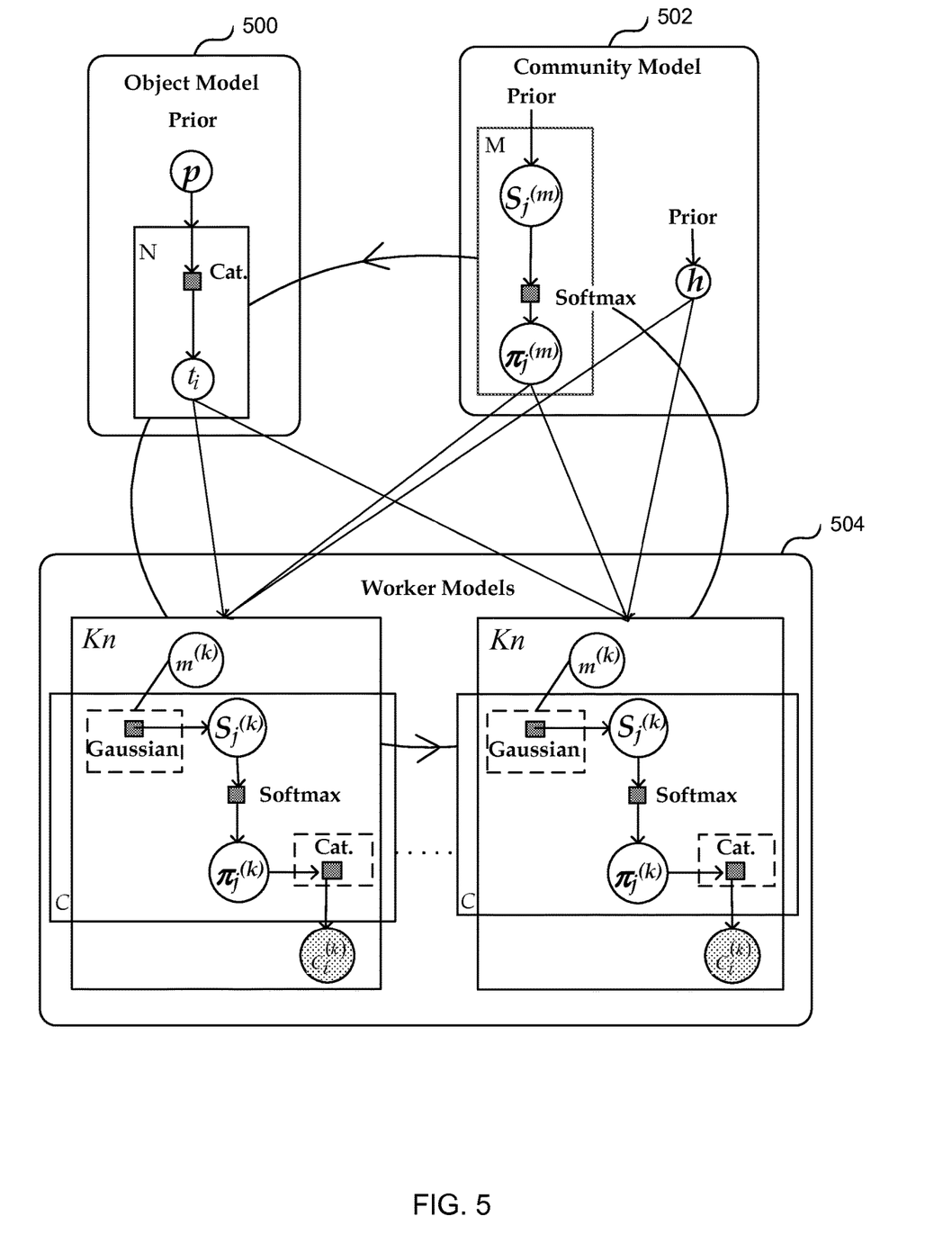
FIG. 5 is a schematic diagram of the probabilistic graphical model of FIG. 4 divided into sub-models to facilitate message passing schedules used in training.

FIG. 5 is a schematic diagram of a scalable implementation of the model of FIG. 4 whereby the model of FIG. 4 is split into sub-models. This model decomposition implementation technique enables the inference components to be trained on large-scale data sets (e.g. hundreds of thousands or millions of labels).

In FIG. 5 the model is split into three sub-models: object model 500, community model 502 and a set of worker models 504. This enables the inference components to run (cheaper) local inference in each sub-model, and merge the post-inference results using standard message passing calculations. To define the user models, split the set of workers K into a complete and disjoint partition: $K = \{K_1, \ldots, K_J\}$. Each subset K is associated with a single worker model instance which infers the variables $\pi^{(k)}$ and $s^{(k)}$ for the workers in $K_i$. The object model infers the variables $t_i$ and p of all the objects. Similarly, the community model infers the variables h, $s^{(k)}$ and $\pi^{(k)}$ of all the workers.

The three models are connected together through the probabilistic relationships between $t_i$ and $\pi^{(k)}$ and between $s^m$ and $S^k$, as described above. To run inference in this model architecture, iteratively run the inference message passing algorithm in each of the three sub-models in a scheduled order and repeat this process until all the merged posterior distribution convergences. The factor graph and the inference schedule of this scalable implementation is depicted in FIG. 5.

The type of implementation described with respect to FIG. 5 has several benefits in terms of scalability. First, the space complexity is reduced by running local inference in simpler sub-models and merging the results using only a few messages exchanged between the connecting factors. Second, it is possible to parallelise the computation of each sub-model with an evident saving of time complexity. Using just the first of these techniques, it has been demonstrated that it is possible to train the model of FIG. 5 on a dataset of 722,970 data points in approximately 20 minutes on a standard machine with 3.60 GHz CPU and 16 GB RAM.

FIG. 6 shows a probabilistic graphical model corresponding to inference algorithms which may be implemented at the predictor. This model assumes that the true label $t_i$ is generated from a categorical distribution with parameters p where p denotes the class proportions for all the tasks. Similarly, each labelling outcome $c_i^{(k)}$ is generated from a categorical distribution with parameters $\pi_j^{(k)}$. The true label $t_i$ is a random variable that acts as a selector of the parameters (i.e. the rows of the worker confusion matrix $\pi_j^{(k)}$) of the categorical distribution that generates each labelling outcome. The factor graph is shown in FIG. 6 where the selection of the confusion matrix row by the random variable $t_i$ is shown using the gate (dashed box 606). The factor graph comprises plate 600 which is replicated for each worker k of the set of K workers in the crowd. The factor graph comprises plate 602 which is replicated for each possible task label value j from the set C of possible label values. The factor graph comprises plate 604 which is replicated for each task I from the set of N tasks in the task pool.

In the model of FIG. 6 it is assumed that the tasks are labelled independently and that the classification answers by each worker are also independent so that the following data likelihood is obtained where D is the set of all the labels provided by the workers for all the tasks $$p(D|\pi,t,p)=\Pi_{i=1}^{N}\text{Cat}(t_i|p)\Pi_{k=1}^{K}\text{Cat}(c_i^{(k)}|\pi_{t_i}^{(k)})$$

Which is expressed in words as the probability of the set of all the labels provided by the workers for all the tasks, given the inferred variables is equal to the product of the probability of each label given p, times the product of the probability of each true label value given the worker confusion matrices.

The inferred variables in the model of FIG. 6 are influenced with prior knowledge. For example a Dirichlet prior with a vector of hyperparameters influences variable node p. For example, the prior of each row of the confusion matrix may be Dirichlet distributed with hyperparameters $\beta_j$. The joint posterior distribution for all the inferred variables in FIG. 6 is then $$p(\pi,t,p|D) \propto \text{Dir}(p|\alpha)\Pi_{i=1}^{N}\{\text{Cat}(t_i|p)\Pi_{k=1}^{K}\text{Cat}(j_i^{(k)}|\pi_{t_i}^{(k)})\text{Dir}(\pi_j^{(k)}|\beta_j)\}$$

Since the workers labels $c_i^{(k)}$ are usually known, the approximate inference of the marginal posteriors of the inferred variables may be performed by Gibbs sampling or variational methods.

The inference algorithms may be computer implemented using software and/or hardware. In some examples the inference algorithms are implemented, in whole or in part, using one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units (GPSs) or other.

Figure 7:
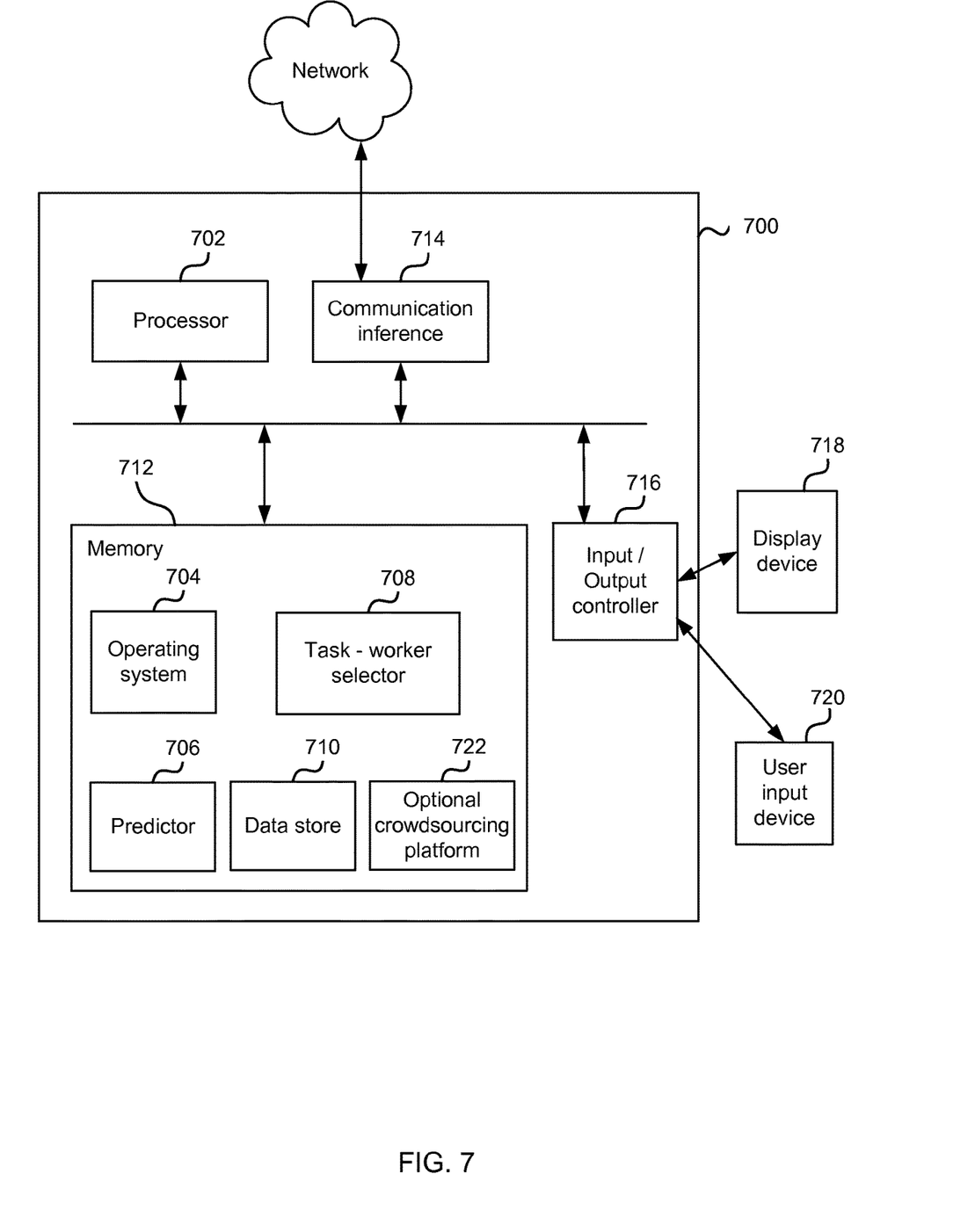
FIG. 7 illustrates an exemplary computing-based device in which embodiments of inference components, optionally with a crowdsourcing platform and task requestor may be implemented.

FIG. 7 illustrates various components of an exemplary computing-based device 700 which may be implemented as any form of a computing and/or electronic device, and in which embodiments of any of the methods described herein may be implemented.

Computing-based device 700 comprises one or more processors 702 which may be microprocessors, controllers or any other suitable type of processors for processing computer executable instructions to control the operation of the device in order to select combinations of tasks and workers so as to optimize information gain. The instructions may also control the operation of the device in order to aggregate crowdsourced labels, learn characteristics of worker communities, learn community memberships of workers or learn an optimal number of worker communities in a crowd of workers. In some examples, for example where a system on a chip architecture is used, the processors 702 may include one or more fixed function blocks (also referred to as accelerators) which implement a part of the methods described herein (rather than software or firmware). Platform software comprising an operating system 704 or any other suitable platform software may be provided at the computing-based device to enable application software to be executed on the device. In an example computing-based device 700 may further comprise a task-worker selector 708 and a predictor 706 comprising inference algorithms as described herein. The computing-based device may comprise a crowdsourcing platform 722 to issue tasks to workers and to receive answers. Data store 710 may store data observed by the crowdsourcing platform, data learnt by the inference components, parameter values, inference algorithms and other data.

The computer executable instructions may be provided using any computer-readable media that is accessible by computing based device 700. Computer-readable media may include, for example, computer storage media such as memory 712 and communications media. Computer storage media, such as memory 712, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 712) is shown within the computing-based device 700 it will be appreciated that the storage may be distributed or located remotely and accessed via a network or other communication link (e.g. using communication interface 714).

The computing-based device 700 also comprises an input/output controller 716 arranged to output display information to a display device 718 which may be separate from or integral to the computing-based device 700. The display information may provide a graphical user interface. The input/output controller 716 is also arranged to receive and process input from one or more devices, such as a user input device 720 (e.g. a mouse, keyboard, camera, microphone or other sensor). In some examples the user input device 720 may detect voice input, user gestures or other user actions and may provide a natural user interface (NUI). This user input may be used to input answers to tasks, specify tasks, specify inference algorithms, input graphical models, set parameter values and for other purposes. In an embodiment the display device 718 may also act as the user input device 720 if it is a touch sensitive display device. The input/output controller 716 may also output data to devices other than the display device, e.g. a locally connected printing device.

Any of the input/output controller 716, display device 718 and the user input device 720 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Examples describe a computer-implemented method comprising:

accessing a task from a pool of tasks to be completed by a plurality of workers in a crowd of workers;

accessing a machine learning system having been trained using observations of one or more of the tasks completed by one or more of the workers, the machine learning system comprising inferred variables comprising at least a number of communities of the workers;

calculating, using at least some of the inferred variables, predicted information gains expected from assigning individual ones of the tasks to individual ones of the communities of the workers;

selecting a pair comprising one of the tasks and one of the communities on the basis of the calculated information gains; and allocating the task of the selected pair to the community of the selected pair.

By calculating predicted (or expected) information gain it is possible to select task-community pairs in a way which will produce the most improvement in knowledge of the "true" answers to the tasks. This is achieved in a workable, practical manner using conventional computing equipment, by assigning tasks to communities of workers rather than individuals. The communities of workers are learnt by the machine learning system rather than being pre-specified. The result is an adaptive task assignment system which reasons about which community should label which task. In contrast, active learning systems only reason about which is the next task to be labelled.

For example the calculated information gains are information gained about answers to the tasks in the pool. This enables the most information about all the tasks to be found quickly by repeating the process.

In examples the tasks are labelling tasks and calculating the predicted information gain comprises predicting a label of a task, updating the machine learning system using the predicted label and comparing at least some of the inferred variables before and after the update. This enables the information gain to be calculated in an accurate way which is also able to be computed quickly. In this way the method can scale up to web scale applications involving large numbers of tasks, workers, task labels.

In examples the machine learning system comprises inference algorithms corresponding to a first model and a second model, the first model taking into account communities of workers and the second model not taking into account communities of workers. This enables communities of workers to be taken into account.

For example, updating the machine learning system using the predicted label comprises updating the second model. This enables computation to be fast and efficient because the second model may be simpler than the first model. For example, FIGS. 4 and 5 show example first models and FIG. 6 shows an example second model.

In examples the first model comprises inferred variables comprising community variables, worker variables and task variables. This enables these inferred variables to be used by the second model.

For example, the second model is configured for a number of workers, the number of workers being the same as the number of communities of the workers. This enables the second model to be used to accurately compute updates to the inferred variables for the information gain calculation.

In the example described immediately above, the second model may comprise inferred variables which are informed by inferred variables from the first model. In examples a worker confusion matrix of the second model is informed by a community confusion matrix of the first model. For example, each confusion matrix is a 2D array representing the biases of a worker, or a community of workers. For example, each confusion matrix is a 2D array in which the rows and columns are indexed by possible label values, with an entry representing the probability that a worker or community will pick that column's label given the true label as represented by the row.

In examples prior knowledge is used to inform the inference at the machine learning system, the prior knowledge comprising any one or more of: a number of the worker communities, composition of the worker communities. This improves accuracy of the crowdsourcing system.

In examples the machine learning system is updated by sending the predicted label to the machine learning system and receiving inference results in reply. This enables the machine learning system to be provided as a cloud service used, for example, by a resource constrained device.

In examples the crowdsourcing system observes labels allocated to tasks as a result of the allocation and updates the machine learning system using the observed labels.

In an example, a computer-implemented method of labeling items comprises:

accessing a task from a pool of tasks to be completed by a plurality of workers in a crowd of workers;

training a machine learning system using observations of one or more of the tasks completed by one or more of the workers, the machine learning system comprising inferred variables comprising at least a number of communities of the workers;

calculating, using at least some of the inferred variables, a predicted information gain of assigning the task to individual ones of the communities; and selecting one of the communities on the basis of the calculated information gains.

In an example, a crowdsourcing system comprises:

a communication interface arranged to issue, over a communications network, a labeling task to a plurality of workers participating in the crowdsourcing system;

the communications interface arranged to receive, over the communications network, labels assigned to the issued task by two or more of the workers; the crowdsourcing system comprising at least one processor adapted to execute stored instructions; and a memory comprising code configured to:

access, a machine learning system having been trained using observations of one or more of the tasks completed by one or more of the workers, the machine learning system comprising inferred variables comprising at least a number of communities of the workers;

calculate, using at least some of the inferred variables, a predicted information gain of assigning the task to individual ones of the communities; and select one of the communities on the basis of the calculated information gains.

In an example the code comprises instructions to calculate the predicted information gain by predicting a label of a task, updating the machine learning system using the predicted label, and compare at least some of the inferred variables before and after the update.

In an example the crowdsourcing system comprises the machine learning system which comprises inference algorithms corresponding to a first model and a second model, the first model taking into account communities of workers and the second model not taking into account communities of workers.

In an example, a crowdsourcing system has code comprising instructions to update the machine learning system using the predicted label by updating the second model.

In an example, the crowdsourcing system comprises the machine learning system and the machine learning system is at least partially implemented using hardware logic selected from any one or more of: a field-programmable gate array, a program-specific integrated circuit, a program-specific standard product, a system-on-a-chip, a complex programmable logic device, a graphics processing unit.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
accessing a task from a pool of tasks to be completed by a plurality of workers in a crowd of workers, the plurality of workers organized into a plurality of communities, each of the plurality of communities comprising two or more of the plurality of workers, and wherein the tasks are labelling tasks;
accessing, using at least one processor, a machine learning system having been trained using observations of one or more tasks previously completed by one or more workers of the plurality of workers, the machine learning system providing inferred variables for the one or more tasks corresponding to respective ones of the plurality of communities and comprising inference algorithms corresponding to a first model that takes into account specified communities, the specified communities each comprising a plurality of individual workers, and a second model that takes into account a number of individual workers equal to a number of the specified communities taken into account by the first model;

for each respective community of the plurality of communities, predicting, using the at least one processor and at least some of the inferred variables, a label for each of a plurality of pairs, each pair of the plurality of pairs comprising the respective community and a respective task of the one or more tasks;

computing updated inferred variables corresponding to the respective community and the respective task for each of the plurality of pairs using the label for each of the plurality of pairs;

calculating an expected information gain based on the inferred variables and the updated inferred variables corresponding to the respective community and the respective task for each of the plurality of pairs by predicting a label of the respective task, updating the machine learning system using the predicted label, and comparing at least some of the inferred variables before and after the update;

selecting a pair of the plurality of pairs comprising the accessed task on the basis of the calculated expected information gain;

identifying a selected community of the plurality of communities as the community of the selected pair; and allocating the accessed task to all of the plurality of workers that belong to the selected community.

2. A method as claimed in claim 1 wherein the calculated information gains are information gained about answers to the tasks in the pool.

3. A method as claimed in claim 1 wherein updating the machine learning system using the predicted label comprises updating the second model.

4. A method as claimed in claim 1 wherein the first model comprises inferred variables comprising community variables, worker variables and task variables.

5. A method as claimed in claim 1 wherein the second model comprises inferred variables which are informed by inferred variables from the first model.

6. A method as claimed in claim 1 wherein a worker confusion matrix of the second model is informed by a community confusion matrix of the first model.

7. A method as claimed in claim 6 wherein each confusion matrix is a 2D array representing the biases of a worker, or a community of workers.

8. A method as claimed in claim 6 wherein each confusion matrix is a 2D array in which the rows and columns are indexed by possible label values, with an entry representing the probability that a worker or community will pick that column's label given the true label as represented by the row.

9. A method as claimed in claim 1 comprising using prior knowledge to inform the inference at the machine learning system, the prior knowledge comprising any one or more of: a number of the worker communities, composition of the worker communities.

10. A method as claimed in claim 1 comprising updating the machine learning system by sending the predicted label to the machine learning system and receiving inference results in reply.

11. A method as claimed in claim 1 comprising observing labels allocated to tasks as a result of the allocation and updating the machine learning system using the observed labels.

12. A computer-implemented method of labeling items comprising:

accessing a task from a pool of tasks to be completed by a plurality of workers in a crowd of workers, the plurality of workers organized into a plurality of communities, each of the plurality of communities comprising two or more of the plurality of workers, and wherein the tasks are labelling tasks;

training, using at least one processor, a machine learning system using observations of one or more of the tasks previously completed by one or more workers of the plurality of workers, the machine learning system providing inferred variables for the one or more tasks corresponding to respective ones of the plurality of communities and comprising inference algorithms corresponding to a first model that takes into account specified communities, the specified communities each comprising a plurality of individual workers, and a second model that takes into account a number of individual workers equal to a number of the specified communities taken into account by the first model;

for each respective community of the plurality of communities, predicting, using the at least one processor and at least some of the inferred variables, a label for each of a plurality of pairs, each pair of the plurality of pairs comprising the respective community and a respective task of the one or more tasks;

computing updated inferred variables corresponding to the respective community and the respective task for each of the plurality of pairs using the label for each of the plurality of pairs;

calculating an expected information gain based on the inferred variables and the updated inferred variables corresponding to the respective community and the respective task for each of the plurality of pairs by predicting a label of the respective task, updating the machine learning system using the predicted label, and comparing at least some of the inferred variables before and after the update;

selecting a pair of the plurality of pairs comprising the accessed task on the basis of the calculated expected information gain;

identifying a selected community of the plurality of communities as the community of the selected pair; and allocating the accessed task to all of the plurality of workers that belong to the selected community.

13. A crowdsourcing system comprising:

at least one processor;

a communication interface arranged to issue, over a communications network, a labeling task to a plurality of workers participating in the crowdsourcing system, the plurality of workers organized into a plurality of communities, each of the plurality of communities comprising two or more of the plurality of workers;

the communication interface arranged to receive, over the communications network, labels assigned to the issued task by two or more of the workers;

the crowdsourcing system comprising at least one processor adapted to execute stored instructions; and a memory comprising code configured to:

access, using the at least one processor, a machine learning system having been trained using observations of one or more tasks previously completed by one or more workers of the plurality of workers, the machine learning system providing inferred variables for the one or more tasks corresponding to respective ones of the plurality of communities and comprising inference algorithms corresponding to a first model that takes into account specified communities, the specified communities each comprising a plurality of individual workers, and a second model that takes into account a number of individual workers equal to a number of the specified communities taken into account by the first model;

for each respective community of the plurality of communities, predict, using the at least one processor and at least some of the inferred variables a label for each of a plurality of pairs, each pair of the plurality of pairs comprising the respective community and a respective task of the one or more tasks;

compute updated inferred variables corresponding to the respective community and the respective task for each of the plurality of pairs using the label for each of the plurality of pairs;

calculate an expected information gain based on the inferred variables and the updated inferred variables corresponding to the respective community and the respective task for each of the plurality of pairs by predicting a label of the respective task, updating the machine learning system using the predicted label, and comparing at least some of the inferred variables before and after the update;

select a pair of the plurality of pairs comprising the accessed task on the basis of the calculated expected information gain;

identify a selected community of the plurality of communities as the community of the selected pair; and allocate the accessed task to all of the plurality of workers that belong to the selected community.

14. A crowdsourcing system as claimed in claim 13 the code comprising instructions to update the machine learning system using the predicted label by updating the second model.

15. A crowdsourcing system as claimed in claim 13 comprising the machine learning system and wherein the machine learning system is at least partially implemented using hardware logic selected from any one or more of:

a field-programmable gate array, a program-specific integrated circuit, a program-specific standard product, a system-on-a-chip, a complex programmable logic device, a graphics processing unit.

* * * * *